Nov. 3, 1953   R. E. PRICE   2,657,505
FEED CONTROL MECHANISM
Filed June 12, 1951
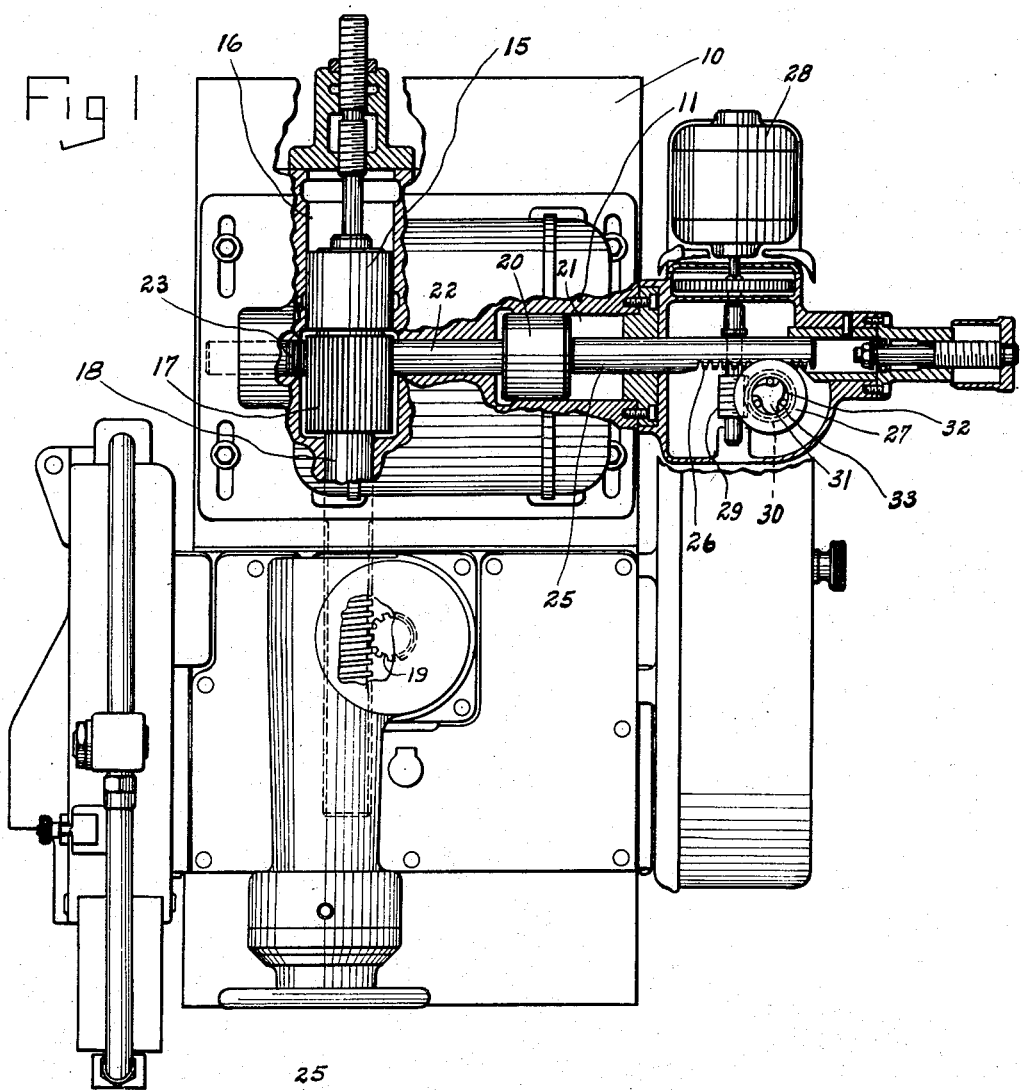
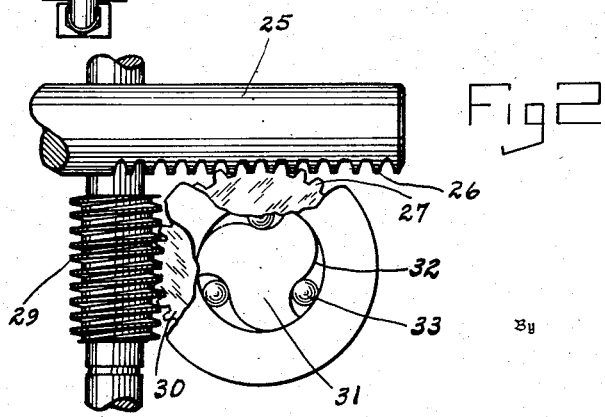
Inventor
RALPH E. PRICE
By
Attorney

Patented Nov. 3, 1953

2,657,505

UNITED STATES PATENT OFFICE 2,657,505

FEED CONTROL MECHANISM

Ralph E. Price, Highfield, Md., assignor to Landis Tool Company, Waynesboro, Pa.

Application June 12, 1951, Serial No. 231,228

7 Claims. (Cl. 51—165)

This invention relates to a feed control device for machine tools, particularly for a wheel mechanism of a grinding machine.

Previous attempts to control hydraulic feed mechanisms made use of mechanical or hydraulically operated receding stops which had to be reset after each feeding cycle.

It is therefore an object of this invention to provide means independent of the feed actuating means for positively and uniformly determining the rate of feed movement.

A further object is to provide a feed control which can operate continuously without resetting.

A further object is to provide an apparatus for controlling the feed movement whereby the feed mechanism may be reversed for resetting while the control means operates continuously in the same direction.

In the drawing: Fig. 1 shows a plan view of the wheel support of a grinding machine with portions cut away to show the application of this invention.

Fig. 2 shows an enlarged view of the overrunning clutch.

For the purpose of illustration, this invention is shown as applied to a feed mechanism of the type disclosed in Patent 2,335,356 granted November 30, 1943. This apparatus consists of a wheel base 10 slidably mounted on bed 11. The feed mechanism consists generally of a rapid feed piston 15 slidably mounted in a cylinder 16 in a bed 11. Attached to piston 15 is an elongated pinion 17 and a feed screw 18. Said feed screw is connected to the wheel base 10 by a pinion 19 which also serves as a nut shown more in detail in the patent mentioned above.

A slow feed piston 20 slidably mounted in a cylinder 21 in bed 11 will move in a direction perpendicular to the movement of piston 15. Piston 20 has a rod 22 on which are cut rack teeth 23 for operatively engaging the teeth on pinion 17. Piston 20 also has a tail rod 25 having rack teeth 26 cut thereon for engaging pinion 27. Pinion 27 is driven by an adjustable speed motor 28 through suitable speed reducing means including a worm 29 and a worm wheel 30. Obviously an adjustable speed transmission with a constant speed motor instead of said adjustable speed motor would serve the same purpose. Fluid under pressure is supplied to cylinder 21 without any throttle valve or other restriction for controlling the rate of movement.

Pinion 27 is a ring having teeth on the outside diameter thereof. The inside diameter forms part of an overrunning clutch which consists of a shaft 31 driven through said speed reducing means by motor 28. Said shaft has a series of peripherally spaced wedge shaped cam surfaces 32 thereon forming a series of recesses between said shaft and the inside diameter of pinion 27. In each of said recesses is a ball or roller. If pinion 27, driven by piston 20, tends to move faster than shaft 31, the ball or roller 33 would be rolled toward the narrow portion of the wedge shaped recess, locking shaft 31 and pinion 27 together so that said pinion and hence the feed mechanisms cannot move at a rate greater than that permitted by rotation of shaft 31. If piston 20 is stopped or moved in the opposite direction, pinion 27 will move said ball or roller 33 in a counterclockwise direction to the wide portion of recess 32 so that pinion 27 may rotate in a clockwise direction while shaft 31 continues to rotate in a counterclockwise direction. Thus, a feed control mechanism has been provided, which is in effect a receding stop but which unlike a receding stop does not have to be reset but moves continuously in the same direction regardless of the direction of movement of the feed mechanism.

What I claim is:

1. In a machine tool, means for moving a tool support toward and from an operative position including a feed screw and nut, a piston for moving said screw axially at a rapid rate for moving said support to said operative position, a second piston for effecting a relative rotary movement between said screw and said nut for moving said tool support at a rate suitable for a machining operation, means for controlling the rate of movement of said second piston including a piston rod, rack teeth on said rod, a pinion engaging said teeth, means for rotating said pinion, including a motor, and means connecting said motor and said second piston which prevents said second piston from moving at a rate faster than that determined by said motor.

2. In a machine tool, means for moving a tool support toward and from an operative position including a feed screw and nut, a piston for moving said screw axially at a rapid rate for positioning said support in said operative position, a second piston for effecting a relative rotary movement between said screw and said nut for moving said tool support at a rate suitable for a machining operation, means for controlling the rate of movement of said second piston including a piston rod, rack teeth on said rod, a pinion engaging said teeth, means for rotating said pinion, including a motor and speed change which prevents said second piston from moving at a rate faster than that determined by said motor, an overrunning clutch between said speed change and said pinion for permitting a reverse movement of said second piston for resetting said screw and nut while said motor and speed change continue to operate in the same direction.

3. In a machine tool, means for moving a tool support toward and from an operative position including a feed screw and nut, a piston for moving said screw axially at a rapid rate for moving said support to said operative position, a second piston for effecting a relative rotatable movement between said screw and said nut for moving said tool support at a rate suitable for a machining operation, means for controlling the rate of movement of said piston including a motor and means connecting said motor and said second piston which prevents said second piston from moving at a rate faster than that determined by said motor.

4. In a machine tool, means for moving a tool support toward and from an operative position including a piston and cylinder, means for controlling the rate of movement of said piston including a motor which runs continuously in one direction and means connecting said motor and said piston including a clutch mechanism for preventing said piston from moving at a rate faster than that determined by said motor.

5. In a machine tool, means for moving a tool support toward and from an operative position including a piston and cylinder, means for controlling the rate of movement of said piston including a motor which runs continuously in one direction and means connecting said motor and said piston which permits said piston to be reset while maintaining said motor connection therewith.

6. In a machine tool, a base, a tool support movably mounted thereon means for moving the tool support toward and from an operative position including a piston and cylinder, one of which is connected to move said support, means for controlling the rate of movement of said tool support including a motor operable continuously in one direction and means connecting said motor and said tool support including an overrunning-clutch.

7. In a machine tool, a base, a tool support movably mounted thereon means for moving the tool support toward and from an operative position including a piston and cylinder, one of which is connected to move said support, means for controlling the rate of movement of said tool support including a motor operable continuously in one direction and means for stopping or reversing the movement of said tool support independently of the direction of movement of said motor.

RALPH E. PRICE.

References Cited in the file of this patent

UNITED STATES PATENTS

| Number | Name | Date |
|---|---|---|
| 2,241,634 | Decker | May 13, 1941 |
| 2,486,244 | Balsiger et al. | Oct. 25, 1949 |

FOREIGN PATENTS

| Number | Country | Date |
|---|---|---|
| 363,544 | Great Britain | Dec. 24, 1931 |